UNITED STATES PATENT OFFICE.

ALEXANDER HORWITZ, OF NEW YORK, N. Y.

SULFONATED RESIN AND METHOD OF MAKING THE SAME.

1,373,886. Specification of Letters Patent. Patented Apr. 5, 1921.

No Drawing. Application filed November 19, 1918. Serial No. 263,170.

*To all whom it may concern:*

Be it known that I, ALEXANDER HORWITZ, a citizen of the United States, and residing at New York, in the county of New York and State of New York, have invented a certain new and useful Sulfonated Resin and Method of Making the Same, of which the following is a specification, such as will enable those skilled in the art to which it appertains to make and use the same.

This invention relates to articles of manufacture, and to the method of making the same, and the object thereof is to provide an article of manufacture comprising a sulfonated resin adapted to be used in the arts for various purposes, and the invention consists of the said sulfonated resin together with the method of making the same. It is a wellknown fact that resin is composed of resin acid or acids in crude form, and contains some unsaponifiable matter and, in the practice of my invention, I take a predetermined part of resin and reduce the same to a powdered or finely divided condition, after which the said powdered resin is treated with concentrated sulfuric acid. which operation is performed as follows.

I first take a predetermined part of resin say, for example, one pound and a pint of the mineral acid, and gradually mingle the resin with the acid in small quantities in which operation the acid is constantly stirred, and this operation is continued until the solution thus formed begins to thicken, after which more of the acid is gradually added to keep the solution in liquid form, and this operation is continued until the given quantity of resin is used.

The liquid solution thus formed is now stirred or agitated for about an hour, after which the said solution is allowed to rest till the undissolved part of the resin rises to the top, and this undissolved part of the resin which rises to the top of the solution is then removed by skimming or otherwise, after which the solution is allowed to stand for a period of eight hours more or less, during which time said solution is stirred occasionally so as to permit any undissolved resin remaining therein to rise to the top of the solution and to be removed.

This operation produces a complete solution, or a solution as nearly complete as possible, and this solution may be strained, if desired, to remove any other undissolved substances that may remain therein. The solution thus formed contains free or uncombined sulfuric acid, and said solution is washed with a concentrated salt solution namely sodium chlorid till the free or uncombined acid is removed, which operation produces a product consisting of sulfonated resin in flaked or powdered form, and a solution of sodium sulfate, which latter is produced by the combination of the uncombined sulfuric acid with the salt solution.

The product thus formed consisting of the sulfonated resin and the solution of sodium sulfate is filtered to separate the liquid sodium sulfate from the sulfonated resin, after which pressure is applied to the sulfonated resin to force out any liquid that may be therein and this product is then thoroughly dried.

The sulfonated resin thus formed may be used in the making of soap or other articles in the making of which the sulfonated resin is neutralized, and a soap so formed is more soluble in water than other soaps containing resin and made in the usual manner. It may also be used in making certain articles, such as printers' ink in which operation the sulfonated resin must be neutralized before it is used, in order to make it soluble, in water, or so that it will mix with oil. The neutralization of the sulfonated resin is as follows.

The sulfonated resin is first dissolved in a warm or hot alkali solution until the product is neutral as shown by a test, or the sulfonated resin may be dissolved in alcohol and then neutralized with an alkali solution such as sodium hydroxid.

From the foregoing it will be seen that a sulfonated resin is the basis of this invention, but my invention is not limited to the process, herein described, of forming or producing a sulfonated resin. Instead of taking resin and sulfuric acid, and proceeding, as herein described, to produce a sulfonated resin, I may take resin in combination with an oil, fatty substance, or any other substance, that can be sulfonated and treat the same with sulfuric acid to produce a sulfonated product containing sulfonated resin.

The sodium sulfate produced, as herein set out, is a by-product of the process herein described and may be used wherever such product is desired.

Having fully described my invention, what I claim as new and desire to secure by Letters Patent, is:—

1. An article of manufacture comprising a sulfonated resin which is soluble in water.

2. The method herein described of producing a sulfonated resin which is soluble in water by the treatment of resin with sulfuric acid, substantially as described.

3. The method herein described of producing a sulfonated resin, by the treatment of resin with sulfuric acid and neutralizing the same with an alkali solution to produce a sulfonated resin soluble in water.

4. The method herein described of producing a sulfonated resin by the treatment of resin with sulfuric acid, separating the excess sulfuric acid from the solution thus produced, and neutralizing the remaining product with an alkali solution to produce a sulfonated resin soluble in water.

In testimony that I claim the foregoing as my invention I have signed my name in presence of the subscribing witnesses this 15th day of November, 1918.

ALEXANDER HORWITZ.

Witnesses:
C. E. MULREANY,
H. E. THOMPSON.